April 4, 1961 R. P. GIFFORD ET AL 2,978,684

NOISE SUPPRESSOR FOR MAGNETIC CORE LOGIC CIRCUITS

Filed Sept. 22, 1958 2 Sheets-Sheet 1

INVENTORS:
RICHARD P. GIFFORD,
ROSS F. SUIT,

BY Joseph P. Kates
THEIR ATTORNEY.

INVENTORS:
RICHARD P. GIFFORD,
ROSS F. SUIT,
BY Joseph P. Kates
THEIR ATTORNEY.

United States Patent Office 2,978,684

Patented Apr. 4, 1961

2,978,684

NOISE SUPPRESSOR FOR MAGNETIC CORE LOGIC CIRCUITS

Richard P. Gifford, De Witt, and Ross F. Suit, East Syracuse, N.Y., assignors to General Electric Company, a corporation of New York Filed Sept. 22, 1958, Ser. No. 762,440

8 Claims. (Cl. 340—174)

My invention relates to logic circuitry and more particularly magnetic core logic circuitry.

Magnetic core circuits have, in the past, been utilized in a number of logic circuits, such as ring counters and binary counting chains. The circuits employ a core of magnetic material which has a substantially square hysteresis loop. Two or more windings, including at least an input winding and an output winding, are wound on this core. One of these windings is connected to a source of input pulses which move the core of the magnetic circuit between two predetermined saturation states on its hysteresis loop.

An information pulse should appear at the output winding only when the magnetic core is driven from one saturation state to the other by an input pulse. When the magnetic core is already at the state of saturation toward which the input pulses tend to move it, an information pulse should not appear on the output winding. Since, in this case, the magnetic core is already saturated, there is no magnetic coupling between the input and the output windings.

In actual practice, however, a small pulse, often called a "sneak" pulse, does appear on the output winding. This pulse may appear because the magnetic core does not have a perfectly square hysteresis loop or because there is a certain amount of "air" coupling between the input and the output windings. This "sneak" pulse is particularly undesirable when several of the output windings are connected in series. In this case, the "sneak" pulses may be added together to produce a pulse of the same magnitude as the information pulse output. In order to prevent false operation of logic circuits employing magnetic core elements, it is desirable to suppress such "sneak" pulses; and the present invention is primarily concerned with circuitry for suppressing such "sneak" pulses.

It is accordingly an object of the present invention to provide an improved magnetic core logic circuit.

It is another object of the present invention to provide an improved "sneak" pulse suppressor circuit for a magnetic core logic circuit.

Still another object of the present invention is the provision of an improved circuit for cancelling undesired noise while allowing the information pulses to pass without distortion.

Further objects of the invention will become more apparent from the detailed description and appended claims that follow.

In accomplishing the foregoing objects, my invention, in one embodiment thereof, is applied to a ring counter which includes a number of storage elements, each having a magnetic core having thereon an input winding, an output winding and a third or regenerative winding. Normally, when a driving pulse is applied to the input winding of one of the magnetic core elements, a noise component will appear along the leading edge of the pulse on the output winding while the information component, if there is one, will occur along the trailing edge. In accordance with this embodiment of my invention, a coupling is provided for coupling the noise component of the pulse on the third winding back to the output winding with a polarity such that the noise component on the output winding is cancelled. The time constant of the coupling circuit is chosen so that only the leading edge, i.e., the noise pulse of the total output pulse will be cancelled.

In the subsequent discussion, my invention is illustrated in conjunction with a ring counter. Those skilled in the art will appreciate that the invention may be used with other magnetic core logic circuits.

For a better understanding of my invention, reference may be made to the accompanying drawings in which.

Fig. 3*a* shows the clock pulses which trigger a transistor into conduction to drive the ring counter.

Fig. 3*b* shows the pulses which appear on the output windings of the storage elements of the shift register when the noise cancellation technique of the subject invention is not employed.

Fig. 3*c* shows the pulses which appear on the regenerative winding of the storage elements of the shift register.

Fig. 3*d* shows the portion of the pulses appearing on the regenerative winding which is coupled back to the output winding to effect noise cancellation.

Fig. 3*e* shows the pulses which appear at the output windings of the storage elements of the shift register when the noise cancellation technique of the subject invention is employed.

Figure 1:
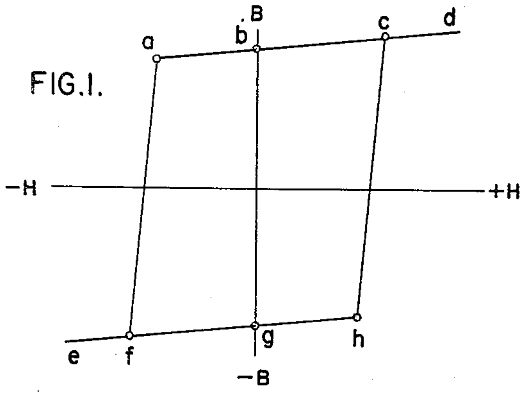
Fig. 1 shows the hysteresis loop of a magnetic material of a type which might be used as the core in a magnetic logic circuit.

Referring now to the hysteresis curve of Fig. 1, it can be seen that when a positive magnetizing force, +H is applied to the magnetic core through the input winding, the core will be driven to a state of flux saturation somewhere along that portion of the curve *b*—*d*. When the magnetizing force is removed, the core will return to the point *b* on the curve. If a negative magnetizing force is applied, the core will be driven along the line *b*—*a*—*f* and thence to a point along the line *f*—*e* depending on the magnitude of the magnetizing force. The core will return to the point *g* when the magnetizing force is removed. The points *b* and *g* represent two states of saturation of the magnetic core. The point *b* will hereinafter be referred to as the "0" state and the point *g* will be referred to as the "1" state.

Figure 2:
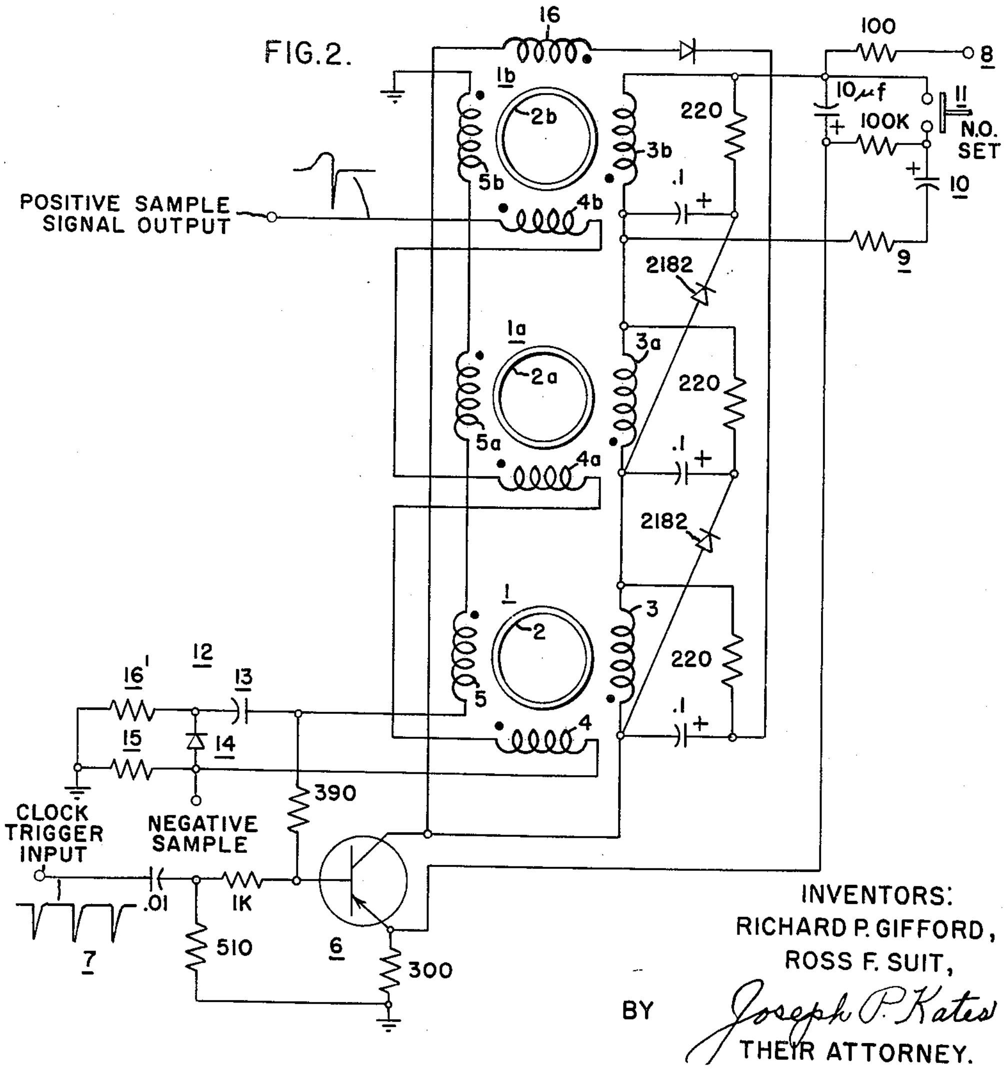
Fig. 2 is a circuit diagram of a ring counter employing the coupling circuit used in accomplishing the noise cancellation.

Referring particularly to Fig. 2, the present invention is shown employed in conjunction with a ring counter of the type well-known in the prior art. The operation of the magnetic core ring counter shown in the subject embodiment is described in detail in the Patent 2,652,501 issued to Mr. V. L. Wilson. The ring counter contains a number of magnetic storage elements indicated as 1, **1*a* and 1*b*. In the present embodiment only three storage elements are shown, but it will be appreciated that any number of magnetic storage elements necessary could be included in the shift register. The storage element 1 has a magnetic core 2 having a substantially square hysteresis loop so that the core can be driven to either of two states of saturation. An input winding 3, an output winding 4, and a third or regenerative winding 5 are wound in flux linking relation on the magnetic core 2. The storage elements 1*a* and 1*b* have corresponding components. The same numerals are employed for the components of storage elements 1*a* and 1*b***, the subscripts *a* and *b* being added. The last storage element in the chain, **1*b*, has additionally an inductive drive winding 16 which couples the output of stage 1*b* back to the first stage 1** to complete the ring as is common in ring counters of this type.

The input windings 3, **3*a* and 3*b* of successive magnetic storage elements are connected in series and are connected to a source of pulses which drive the cores from the "1" state to the "0" state. In order to effect such driving of the cores, a transistor 6 is connected to be supplied with clock signals 7 from a suitable source. As the clock signals bring the transistor 6 into a state of conduction, a driving pulse is fed to the input winding 3 of the magnetic storage element 1**.

The driving pulse will be coupled from the input winding to the output winding and appear thereon as an information pulse only when the core is driven from one state of saturation to another. The output windings may all be connected in series as shown in the subject embodiment or in any other combination consonant with the function the ring counter is to perform. Most frequently, however, two or more of the output windings will be connected in series to perform a specific logic function.

The regenerative windings 5, **5*a* and 5*b* provide positive feedback from the storage elements to the transistor 6 so that when an input pulse tends to drive an element from the "1" state to the "0" state, the transistor will be held in a state of conduction until the transition of the element from the "1" state to the "0" state is complete. In the embodiment shown, the regenerative windings are connected in series with the negative end of the series connected string being connected to the base of the transistor 6**.

When the magnetic core is in the "0" position, the input winding will present a relatively low impedance to the passage of the driving pulse. The magnetic core is already saturated in the state toward which the input pulses tend to drive it and there is, therefore, very little inductance in the input winding to impede the flow of such a pulse. When all of the magnetic cores of the storage elements are in the "0" position, the driving pulse traverses all the windings in series to the source of negative potential 8.

The last magnetic storage element **1*b* may be set by external means to the "1" position of magnetic saturation. The circuitry for setting the "1" in stage 1*b* consists of a resistor 9, a capacitor 10, and a set button 11, connected in series with the input winding 3*b***. When the set button is pushed, a momentary surge of current will flow into the input winding of the storage element in such a direction as to move the magnetic core toward the "1" position.

Figure 3:
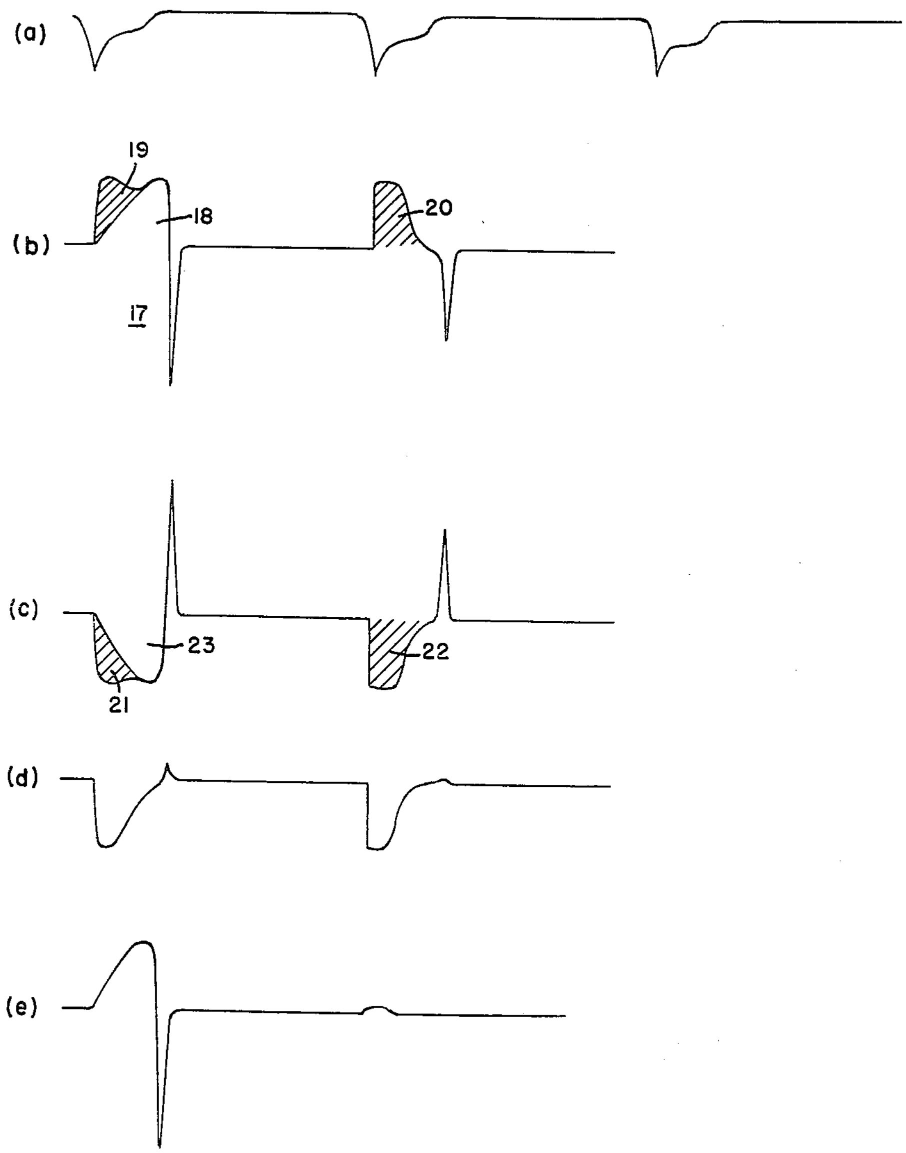
Fig. 3 (*a* through *e*) show wave form diagrams depicting the operation of the ring counter utilizing the subject invention.

The operation of the circuit of Fig. 2 can best be described by referring to the wave forms shown in Fig. 3. Fig. 3*a* shows the clock pulses which are applied to the base of the transistor driver. In response to these clock pulses, the transistor drives the magnetic storage elements toward the "0" state of saturation. If a "1" is set into the last magnetic storage element **1*b* the "1" will be moved to the first storage element 1 by the next occurring clock pulse. This clock pulse will drive the last stage 1*b*** back to the "0" state of saturation. In a similar manner, the "1" will be transferred to the next succeeding storage element by each successive clock pulse. The operation of the circuitry for effecting this transfer will be apparent from the drawings and a consideration of magnetic core ring counters as described in "Digital Computer Components and Circuits," by R. K. Richards, published by Van Nostrand, see page 230 thereof.

If the core of one of the magnetic storage elements is shifted from the "1" state to a "0" state by one of the clock pulses, an output signal as shown at 17 in Fig. 3*b* will appear on the series connected output windings of the storage elements. In this pulse the broad portion along the trailing edge, indicated by the numeral 18, is the information pulse indication of a change of state of the storage element while the shaded portion along the leading edge, indicated by the numeral 19, is noise.

When the magnetic core is already in the "0" state, the driving pulse on the input winding should produce no output on the output winding. Since the core of the storage element is already in the state of saturation toward which the input pulse tends to drive it, there is no magnetic coupling between the input winding and the other windings on each of the cores. In actual practice, however, a small output pulse will appear on the output winding even when the core is in a "0" state at the time the driving pulse is applied to the input winding. As mentioned before, this "sneak" pulse output may be caused by using a magnetic core of a material not having a perfectly square hysteresis loop or because of air coupling between the windings.

This sneak pulse output is particularly undesirable when several of the output windings are connected in series. In this case, the sneak pulse outputs may be added together to produce an output of a magnitude comparable to that of the normal information pulse output. Such an output is shown at 20 in Fig. 3*b*. If the output windings of several of the storage elements are connected in series to a gating network which produces an output only when an information pulse is present on the output windings of one of the storage elements, the sneak pulse outputs might add in such a way as to give a false triggering of the gating circuitry.

The prior art has attempted to solve this problem by using magnetic cores of a material having a perfectly square hysteresis loop and by spacing the windings so that there is very little air coupling. Neither of these methods has been successful since no material has a perfectly square hysteresis loop, and, in the development of miniature logic circuitry, it has become increasingly difficult to provide separation between the windings.

In accordance with the subject invention, the sneak pulse output is suppressed by generating another set of noise and signal pulses substantially identical to the pulses appearing on the output windings. The noise component of the set of pulses is coupled to the output windings with a polarity such that the noise component on the output windings is cancelled. The set of noise and signal pulses which is substantially identical to the pulses appearing on the output windings is generated by a third winding having the same number of turns as the output winding.

Most magnetic storage elements use a regenerative winding indicated as 5 in Fig. 2 to effect regeneration when the core is shifted from one state to the other. We take advantage of the regenerative winding which is already present to generate a set of pulses substantially identical to the pulses on the output winding. The pulse on the series connected regenerative windings is shown in Fig. 3*c*. Note that this pulse is substantially identical to the pulse on the output windings except that it is of opposite polarity. The pulse on the regenerative windings will be substantially identical to the pulse on the output windings whether there has been a shift in the state of the magnetic core, as shown at 21 in Fig. 3*c*, or whether there has been no shift in the state, as shown at 22 in Fig. 3*c*. Again, the shaded portion of the pulses in Fig. 3*c* represent the noise while the unshaded portion 23 represents the information pulse.

The circuitry for coupling the pulse on the regenerative windings to the output windings consists of the coupling circuit 12. This coupling circuit includes a capacitor 13 and a diode 14 connected in series between the regenerative windings and the output windings. The diode 14 is used merely to block the positive transient of the pulse on the regenerative windings from the output windings. The coupling circuit 12 also includes resistors 15 and 16′. The value of resistor 15 is chosen to provide the desired time constant for the coupling circuit. The resistor 16' provides a reference between the junction of the diode 14 and the capacitor 13 and ground.

The coupling circuit, or resistor-capacitor network, 12, has a time constant such that only the leading edge of the pulse appearing on the regenerative winding is coupled from the series connected regenerative windings to the series connected output windings. The leading edge, or noise component, of the pulse appearing on the regenerative windings is coupled to the output windings with a polarity such that the noise appearing on the output windings is cancelled.

The pulse coupled from the regenerative windings back to the output windings is shown in Fig. 3*d*. By choosing the time constant of the coupling circuit 12 so that only the noise component is coupled back, the noise on the output windings will be effectively cancelled and only the information pulse will remain on the output windings as shown in Fig. 3*e*.

In one particular application of the subject invention, the following values of the components making up the coupling circuit were used to provide the desired time constant:

| | |
|---|---|
| Capacitor **13** ------------------microfarads-- | .01 |
| Resistor **15** --------------------------ohms-- | 270 |
| Resistors **16'** -------------------------do---- | 100K |
| Diode **14** ------------------------- | Hughes 1N198 |

The noise cancellation circuit made up of the above components was used in conjunction with a ring counter consisting of ten General Electric 52SL magnetic cores wound with #40 polyurethane wire. In this ring counter seven of the ten output windings were connected in series and all of the regenerative windings were connected in series.

The above values are given merely as an example of the subject invention and should in no way limit the scope of the invention.

A comparison of Fig. 3*e*, showing the pulse on the output windings where the subject noise suppressor has been used and Fig. 3*b* showing the output where no noise suppressor has been used, indicates the improvement in information to noise ratio which can be obtained with the present invention. Note that the noise indicated by the shaded portions in Fig. 3*b* is negligible in Fig. 3*e*.

The embodiment described above shows all of the output windings connected in series; however, less than all of the output windings may be connected in series according to the demands of the particular function which the logic circuitry is to perform. If less than all of the output windings are connected in series, the noise may be over cancelled. However, even if the noise is over cancelled, the information pulse will be negligibly affected and there will be a decided improvement in the information to noise ratio.

Similarly, all of the series connected regenerative windings need not be connected to the noise cancellation circuit as shown in the subject embodiment. The subject invention may be employed with any desired combination of series connections of the output windings or regenerative windings to achieve a substantial reduction in the noise on the output windings.

The subject invention may be used wherever magnetic storage elements are employed; the storage elements may be connected in a ring counter as in the embodiment described, in a binary counting chain, or in other logic circuitry. The noise cancellation circuit of the subject invention may also be employed in conjunction with a single magnetic storage element although the more frequent use is in conjunction with a logic circuit in which the output windings of two or more storage elements are connected in series.

This noise cancelling approach has been quite successful and has allowed logic circuits to be constructed using magnetic cores of a material which does not have a perfectly square hysteresis loop. The use of this noise cancelling technique has also allowed much closer positioning of the windings on the core without concern with the air coupling between windings.

The novel features believed descriptive of the invention are defined particularly in the appended claims.

We claim:

1. A magnetic core logic circuit comprising a magnetic core capable of being driven to two opposite states of saturation, an input winding, and output winding, and a third winding in flux linking relation on the core, means for connecting a source of pulses to the input winding, said pulses tending to shift said core from one state of saturation to the other, means for causing a pulse output having a noise component and an information component to appear on said output winding when the magnetic core is driven from one state of saturation to the other, a sneak pulse output consisting of a noise component only appearing on the output winding when the magnetic core remains in one state of saturation in response to a pulse on the input winding, the flux linking relation of said input winding and said third winding on said core causing a pulse substantially identical to the output pulse on the output winding, but of opposite polarity, to appear on said third winding, and means including a resistor-capacitor network between said third winding and said output winding for coupling the noise component only of the pulse on the third winding to the output winding to cancel the noise component appearing on the output winding.

2. A logic circuit comprising a plurality of magnetic storage elements, each of said magnetic storage elements having a magnetic core capable of being driven to two opposite states of saturation, each of said cores having thereon an input winding, an output winding and a third winding, said third windings of said magnetic storage elements being connected in series, said output windings being connected in series, means for causing a pulse output to appear on the series-connected output windings, said pulse output having a noise component and an information component, the flux linking relation of said input windings and said third windings on said core causing a pulse substantially identical to said pulse on the output windings, but of opposite polarity, to appear on said third windings, and means including a time delay providing a coupling circuit between said third windings and said output windings for coupling the noise component only of the pulse on the third windings to the output windings to cancel the noise component appearing on the output windings.

3. A logic circuit comprising a plurality of magnetic storage elements, each of said magnetic storage elements having a magnetic core capable of being driven to two opposite states of saturation, each of said cores having thereon an input winding, an output winding, and a third winding, said third windings having turns equal in number to the turns of the output windings, said output windings being connected in series, said third windings being connected in series, means for causing a pulse output to appear on each of the series-connected output windings, said pulse output having an information component and a noise component, the flux linking relation of said input windings and said third windings on said core causing a pulse substantially identical to the pulse appearing on the output windings, but of opposite polarity, to appear on the third windings, and a coupling circuit between said third windings and said output windings having a time constant such that only the voltage derived from the leading edge of a pulse on said third windings is fed to the output windings.

4. A logic circuit comprising a plurality of magnetic storage elements, each of said magnetic storage elements having a magnetic core capable of being driven to two opposite states of saturation, each of said cores having thereon an input winding, an output winding, and a third winding, said third windings of said magnetic storage elements being connected in series, said output windings being connected in series, means for causing a pulse output to appear on said series-connected output windings, said pulse output having an information component and a noise component, the flux linking relation of said input winding and said third winding on said core causing a pulse substantially identical to the pulse on said series-connected output windings, but of opposite polarity, to appear on said series-connected third windings, means including a resistor-capacitor network for coupling the noise component only of the pulse on the third windings to the series-connected output windings to cancel the noise component appearing thereon, said resistor-capacitor network having a time constant such that only the noise component of the pulse appearing on the third windings is coupled to the series-connected output windings.

5. A logic circuit comprising a plurality of magnetic storage elements, each of said magnetic storage elements having a magnetic core capable of being driven to two opposite states of saturation, each of said cores having thereon an input winding, an output winding, and a third winding, said third windings having turns equal in number to the turns of the output windings, said third windings of said magnetic storage elements being connected in series, said output windings being connected in series, means for causing a pulse output to appear on said series-connected output windings, said pulse output having an information component and a noise component, the flux linking relation of said input winding and said third winding on said core causing a pulse substantially identical to the pulse on said series connected output windings, but of opposite polarity, to appear on said series-connected third windings, means including a resistor-capacitor network for coupling the noise component of the pulse on the third windings to the series-connected output windings to cancel the noise component appearing thereon, said resistor-capacitor network having a time constant such that only the noise component of the pulse appearing on the third windings is coupled to the series-connected output windings.

6. A logic circuit comprising a plurality of magnetic storage elements, each of said magnetic storage elements having a magnetic core capable of being driven to two opposite states of saturation, each of said cores having thereon an input winding, an output winding, and a third winding, said third windings having turns equal in number to the turns of the output windings, said third windings of said magnetic storage elements being connected in series, said output windings being connected in series, means for causing a pulse output to appear on said series-connected output windings, said pulse output having an information component and a noise component, the flux linking relation of said input winding and said third winding on said core causing a pulse substantially identical to the pulse on said series-connected output windings, but of opposite polarity, to appear on said series-connected third windings, a coupling circuit, said third windings being connected to said output windings through said coupling circuit for coupling the noise component only of the pulse on the third windings to the output windings to cancel the noise component on the output windings, said coupling circuit consisting of a capacitor and a diode connected in series circuit relationship and a resistor connected between the junction of said capacitor and said diode and ground, said coupling circuit having a time constant such that only the noise component of the pulse appearing on the third windings is coupled to the output windings so as to cancel only the noise component of the pulse on the output windings.

7. A magnetic core shift register circuit comprising a plurality of magnetic storage elements, each of said magnetic storage elements having a magnetic core capable of being driven to two opposite states of saturation, each of said cores having thereon an input winding, an output winding and a third winding in flux linking relation on the core, said input windings being connected in series, means for connecting a source of pulses to the first of the series connected input windings, said pulses tending to drive said cores toward only one state of saturation, said output windings being connected in series, said third windings being connected in series, the flux linking relation of said input windings and said output windings on said core causing a pulse output to appear on said series connected output windings, said pulse output having a noise component and an information component, the flux linking relation of said input windings and said third windings on said core causing a pulse substantially identical to the pulse on the output windings, but of opposite polarity, to appear on said third windings, a coupling circuit connected in series circuit relationship between said third windings and said series-connected output windings, said coupling circuit consisting of a capacitor and a diode connected in series circuit relationship, and a resistor connected between the junction of said capacitor and said diode and ground, said coupling circuit having a time constant such that only the noise component of the pulse appearing on the third windings is coupled to the output windings so as to cancel only the noise component of the pulse on the output windings.

8. A magnetic core shift register circuit comprising a plurality of magnetic storage elements, each of said magnetic storage elements having a magnetic core capable of being driven to two opposite states of saturation, each of said cores having thereon an input winding, an output winding and a third winding in flux linking relation on the core, said third winding having turns equal in number to the turns of the output windings, said input windings being connected in series, means for connecting a source of pulses to the first of the series connected input windings, said pulses tending to drive said cores toward only one state of saturation, said output windings being connected in series, said third windings being connected in series, the flux linking relation of said input windings and said output windings on said core causing a pulse output to appear on said output windings, said pulse output having a noise component and an information component, the flux linking relation of said input windings and said third windings on said core causing a pulse substantially identical to the pulse on the output windings, but of opposite polarity, to appear on said third windings, a coupling circuit connected in series circuit relationship between said third windings and said series connected output windings, said coupling circuit consisting of a capacitor and a diode connected in series circuit relationship, and a resistor connected between the junction of said capacitor and said diode and ground, said coupling circuit having a time constant such that only the noise component of the pulse appearing on the third windings is coupled to the output windings so as to cancel only the noise component of the pulse on the output windings.

References Cited in the file of this patent

UNITED STATES PATENTS

| | | |
|---|---|---|
| 2,846,668 | Dunlap | Aug. 5, 1958 |
| 2,876,442 | Disson | Mar. 3, 1959 |